(12) United States Patent
Almotlaq et al.

(10) Patent No.: US 10,190,801 B1
(45) Date of Patent: Jan. 29, 2019

(54) SOLAR HEATING APPARATUS

(71) Applicants: KING SAUD UNIVERSITY, Riyadh (SA); QUDRA ENERGY COMPANY, Riyadh (SA)

(72) Inventors: Yousef Abdullah Almotlaq, Riyadh (SA); Mazen Abdullah Baabbad, Riyadh (SA); Hany Abdulrahman Alansary, Riyadh (SA); Essam Abdulaziz Al Ammar, Riyadh (SA)

(73) Assignee: King Saud University, Riyadh (SA)

( * ) Notice: Subject to any disclaimer, the term of this patent is extended or adjusted under 35 U.S.C. 154(b) by 8 days.

(21) Appl. No.: 15/786,435

(22) Filed: Oct. 17, 2017

(51) Int. Cl.
| | | |
|---|---|---|
| *F24J 2/38* | (2014.01) | |
| *F24J 2/54* | (2006.01) | |
| *F24S 30/452* | (2018.01) | |
| *F24S 23/70* | (2018.01) | |
| *F24S 50/20* | (2018.01) | |
| *F24S 30/00* | (2018.01) | |

(52) U.S. Cl.
CPC ............ *F24S 30/452* (2018.05); *F24S 23/70* (2018.05); *F24S 50/20* (2018.05); *F24S 2030/133* (2018.05)

(58) Field of Classification Search
CPC ...... F24J 2/08; F24J 2/5417; F24J 2/38; F24S 30/452; F24S 23/70
USPC .......................... 126/576, 577, 605–607, 600
See application file for complete search history.

(56) References Cited

U.S. PATENT DOCUMENTS

| | | | |
|---|---|---|---|
| 4,102,326 A | 7/1978 | Sommer | |
| 4,116,539 A | 9/1978 | Evans | |
| 4,276,872 A | 7/1981 | Blake et al. | |
| 4,299,445 A | 11/1981 | Aucouturier | |
| 4,317,031 A | 2/1982 | Findell | |
| 4,586,488 A * | 5/1986 | Noto | F24J 2/38 126/578 |
| 8,000,014 B2 | 8/2011 | Whitehead et al. | |
| 9,441,858 B2 | 9/2016 | Ba-abbad et al. | |
| 2005/0034751 A1 | 2/2005 | Gross et al. | |
| 2007/0070531 A1 | 3/2007 | Lu | |
| 2008/0308091 A1* | 12/2008 | Corio | H02S 20/32 126/606 |

(Continued)

FOREIGN PATENT DOCUMENTS

WO  WO 2013/079824 A1  6/2013

*Primary Examiner* — Avinash Savani
*Assistant Examiner* — Rabeeul Zuberi
(74) *Attorney, Agent, or Firm* — Richard C. Litman

(57) ABSTRACT

The solar heating apparatus includes driven and controllable reflectors for concentrating solar radiation on a solar tower or the like. Each of the reflectors provided in an array of reflectors is selectively driven to rotate about multiple axes of rotation. A plurality of groupings of optical reflectors, such as mirrors or the like, are mounted about a single, common longitudinally extending shaft, providing simultaneous rotation of the optical reflectors about a longitudinal axis. Through a two-axis bearing associated with each grouping of optical reflectors, the optical reflectors are also mounted on a laterally extending shaft associated with each individual reflector grouping. The laterally extending shafts are linked, each to the other, by a continuous belt or the like, providing selective simultaneous rotation of the optical reflectors about the lateral axis in addition to the simultaneous rotation about the longitudinal axis.

7 Claims, 6 Drawing Sheets

(56) References Cited

U.S. PATENT DOCUMENTS

| | | | |
|---|---|---|---|
| 2011/0114080 A1* | 5/2011 | Childers | F03G 7/06 |
| | | | 126/601 |
| 2012/0125404 A1 | 5/2012 | Dos Santos Teixeira Ramos | |
| 2013/0333689 A1* | 12/2013 | Umemoto | F24J 2/5417 |
| | | | 126/605 |
| 2015/0107583 A1* | 4/2015 | Doyle | F24J 2/38 |
| | | | 126/714 |
| 2015/0354858 A1* | 12/2015 | Ba-abbad | F24J 2/38 |
| | | | 126/601 |

* cited by examiner

SOLAR HEATING APPARATUS

BACKGROUND OF THE INVENTION

1. Field

The disclosure of the present patent application relates to solar collectors, and particularly to a solar heating apparatus having reflectors for use with solar power towers, solar heating applications and the like that are selectively and controllably driven to be positioned along multiple axes of rotation.

2. Description of the Related Art

Concentrated solar power systems generate solar power by using mirrors or lenses to concentrate a large area of sunlight or solar thermal energy onto a small area. Electricity is generated when the concentrated light is converted to heat, which drives a heat engine (typically a steam turbine) connected to an electrical power generator, or which powers a thermochemical reaction. Heat storage in molten salts allows some solar thermal plants to continue to generate after sunset and adds value to such systems, when compared to photovoltaic panels.

Parabolic trough reflectors for solar concentrators are formed from a linear parabolic reflector that concentrates light onto a receiver positioned along the reflector's focal line. The receiver is a tube positioned directly above the middle of the parabolic mirror and filled with a working fluid. The reflector follows the sun during daylight hours by tracking along a single axis. A working fluid (e.g., molten salt) is heated to 150-350° C.) as it flows through the receiver and is then used as a heat source for a power generation system. Numerous control and tracking systems exist for driving parabolic trough reflectors to rotate according to the position of the sun, as well as solar radiation availability under changing weather conditions.

A solar power tower includes an array of dual-axis tracking reflectors (commonly referred to as heliostats) that concentrate sunlight on a central receiver atop a tower. The receiver contains a fluid deposit, such as seawater. Optically, a solar power tower is equivalent to a circular Fresnel reflector. The working fluid in the receiver is heated to 500-1000° C. and then used as a heat source for a power generation or energy storage system. An advantage of the solar tower is that the reflectors can be adjusted, rather than the whole tower being repositioned. Solar power towers are presently of great interest, as they offer higher efficiency and better energy storage capability than the older parabolic trough reflector technology. However, solar power tower development is presently far less advanced. It would obviously be desirable to be able to integrate tracking and control systems, such as those used with parabolic trough reflectors, into the arrays of reflectors used with solar power towers. Such systems would have to be modified for rotation about multiple axes, rather than the single axis rotation typically used with parabolic trough reflectors. Thus, a solar heating apparatus solving the aforementioned problems is desired.

SUMMARY

The solar heating apparatus includes a plurality of driven and controllable reflectors for concentrating solar radiation on a solar tower or the like. Each of the reflectors provided in an array of reflectors is selectively driven to rotate about multiple axes of rotation. The multi-axis reflector system includes a pair of longitudinally spaced apart brackets with a pair of two-axis bearings respectively mounted on the pair of longitudinally spaced apart brackets. A longitudinally extending shaft is secured to, and extends between, the pair of two-axis bearings. The longitudinally extending shaft is selectively rotatable about a longitudinal axis.

A pair of laterally extending shafts is respectively secured to the pair of two-axis bearings, and each of the laterally extending shafts is selectively rotatable about a lateral axis orthogonal to the longitudinal axis. At least one reflector mount is secured to each of the laterally extending shafts, and at least one optical reflector, such as a mirror or the like, is mounted on the at least one reflector mount of each laterally extending shaft.

A pair of rotating members, such as pulley wheels, sprockets or the like, are respectively secured to the pair of laterally extending shafts. A continuous belt, chain or the like is mounted on, and extends between, the pair of rotating members to selectively drive simultaneous rotation of the pair of laterally extending shafts about their respective lateral axes. Preferably, at least one motor is provided for driving rotation of the longitudinally extending shaft about the longitudinal axis, and for also driving rotation of the rotating members coupled to the continuous belt, which, in turn, drives rotation of the laterally extending shafts about the lateral axis.

The above describes a simplified system having only a pair of reflector groupings. Preferably, the array of optical reflectors includes one or more central, or secondary, reflector groupings that are positioned between the above pair of reflector groupings. Thus, the multi-axis reflector system preferably further includes at least one secondary laterally extending shaft, which is secured to the longitudinally extending shaft and is positioned between the pair of two-axis bearings. The at least one secondary laterally extending shaft is also selectively rotatable about the lateral axis. At least one secondary reflector mount is secured to the at least one secondary laterally extending shaft, and at least one secondary optical reflector is mounted on the at least one secondary reflector mount. At least one secondary rotating member is secured to the at least one laterally extending shaft for engagement with the continuous belt, thus allowing the central, or secondary, reflector groupings to rotate about both the longitudinal and lateral axes simultaneously with the above pair of end reflector groupings.

In an alternative embodiment, the solar heating apparatus includes a plurality of reflector units, an actuator unit and a longitudinally extending shaft. As in the previous embodiment, the longitudinally extending shaft is selectively rotatable about a longitudinal axis. Each of the reflector units includes a reflector bracket, a two-axis reflector bearing mounted on the reflector bracket, and a laterally extending shaft secured to the two-axis actuator bearing. As in the previous embodiment, the laterally extending shaft is selectively rotatable about a lateral axis. Each of the reflector units further includes at least one reflector mount secured to the laterally extending shaft, at least one optical reflector mounted on the at least one reflector mount, and first and second rotating members, such as pulley wheels, sprockets or the like, respectively secured to the laterally extending shaft.

The actuator unit includes an actuator bracket, a two-axis actuator bearing mounted on the actuator bracket, and a third rotating member secured to the two-axis actuator bearing. The actuator unit further includes a linear actuator for selectively rotating the two-axis actuator bearing about the longitudinal axis and a motor for selectively driving rotation of the third rotating member. A plurality of continuous belts are provided, with one of the continuous belts being mounted on, and extending between, the third rotating member and the first rotating member of an adjacent one of the plurality of reflector units. A remainder of the plurality of continuous belts are divided into first and second sets of continuous belts, with the first set of continuous belts being respectively mounted on, and extending between, the first rotating members of a first set of adjacent ones of a remainder of the plurality of reflector units, and the second set of continuous belts being respectively mounted on, and extending between, the second rotating members of a second set of adjacent ones of the remainder of the plurality of reflector units.

One end of the longitudinally extending shaft is mounted on the two-axis actuator bearing and each of the two-axis reflector bearings is secured to the longitudinally extending shaft. The linear actuator selectively drives rotation of the longitudinally extending shaft about the longitudinal axis, and the motor selectively drives rotation of each of the laterally extending shafts by driving rotation of the third rotating member.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
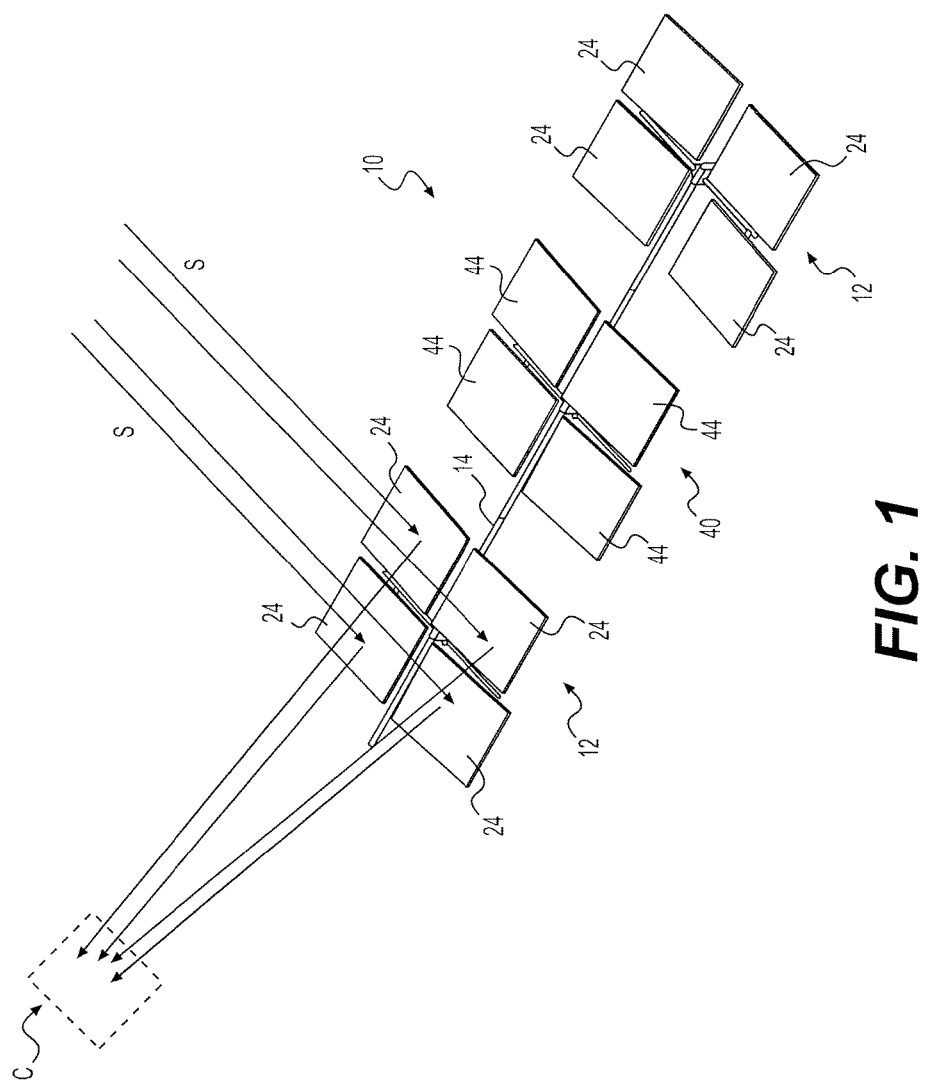
FIG. 1 is an environmental perspective view of the solar heating apparatus.

As shown in FIG. 1, the solar heating apparatus 10 includes a plurality of driven and controllable reflectors 24, 44 for concentrating solar radiation on a solar tower or the like. In FIG. 1, a generalized concentrator target C is shown receiving the reflected solar radiation S. It should be understood that the solar heating apparatus 10 may be used with any suitable type of solar tower, solar concentrator or the like, requiring concentrated reflected solar radiation. Additionally, it should be understood that a typical reflector array consists of hundreds or thousands of individual reflectors (i.e., heliostats). For purposes of clarity and illustration, FIG. 1 only shows one small portion of a typical array, including a pair of end reflector groupings 12 and only a single central, or secondary, reflector grouping 40. In practice, there would be a relatively large number of central, or secondary, reflector groupings 40, and there would also be a relatively large number of repeated linear arrays, such as that shown in FIG. 1. As will be described in detail below, each of the reflectors 24, 44 provided in the array of reflectors is selectively driven to rotate about multiple axes of rotation.

Figure 2:
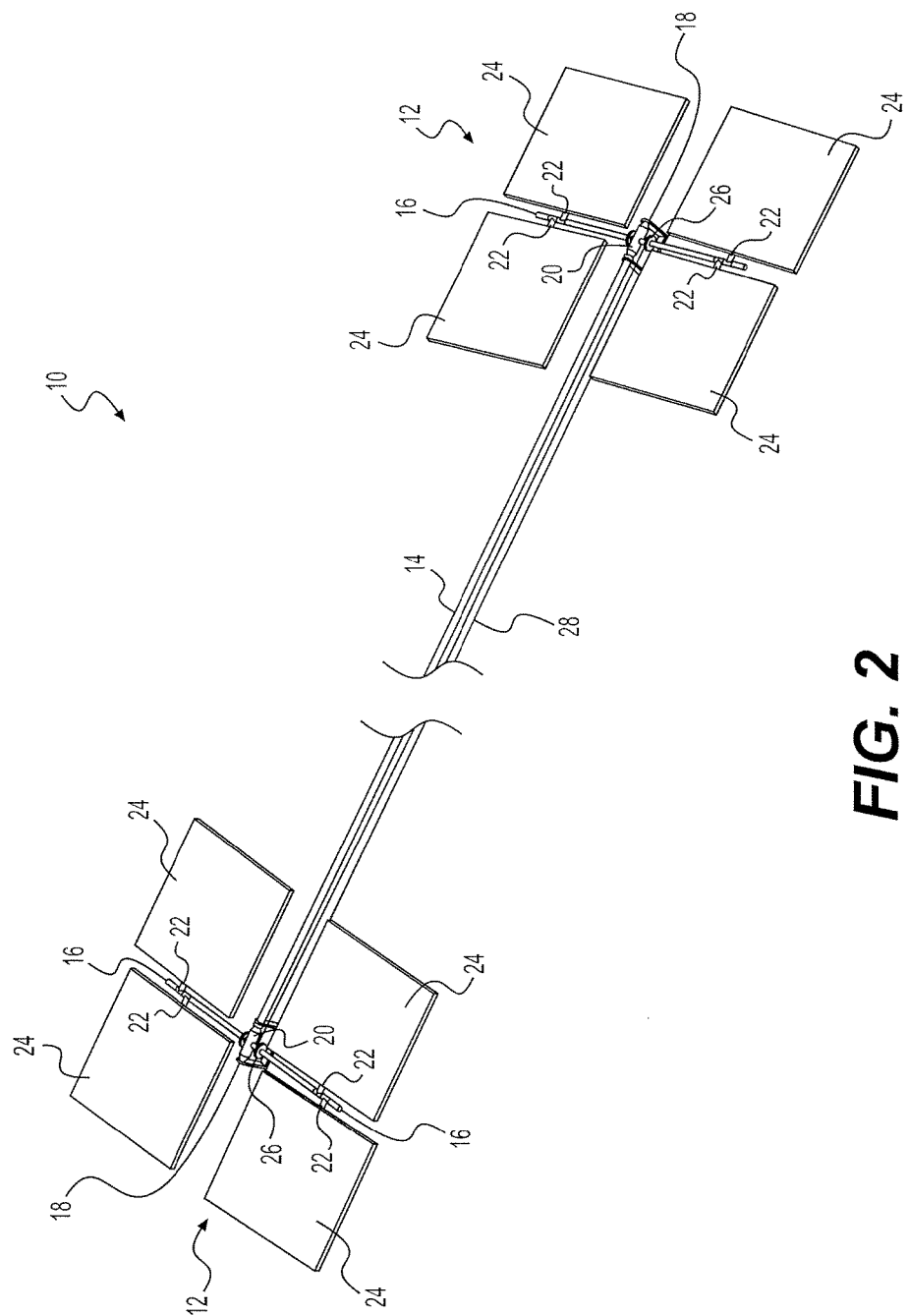
FIG. 2 is a partial perspective view of the solar heating apparatus.

As best shown in FIG. 2, the solar heating apparatus 10 includes a pair of longitudinally spaced apart brackets 18 and a pair of two-axis bearings 20 respectively mounted on the pair of longitudinally spaced apart brackets 18. A longitudinally extending shaft 14 is secured to, and extends between, the pair of two-axis bearings 20. The longitudinally extending shaft 14 is selectively rotatable about a longitudinal axis.

A pair of laterally extending shafts 16 are respectively secured to the pair of two-axis bearings 20, and each of the laterally extending shafts 16 is selectively rotatable about a lateral axis, which is orthogonal to the longitudinal axis. At least one reflector mount 22 is secured to each of the laterally extending shafts 16, and at least one optical reflector 24, such as a mirror or the like, is mounted on the at least one reflector mount 22 of each laterally extending shaft 16.

A pair of rotating members 26, such as pulley wheels, sprockets or the like, are respectively secured to the pair of laterally extending shafts 16. A continuous belt 28, chain or the like is mounted on, and extends between, the pair of rotating members 26 to selectively drive simultaneous rotation of the pair of laterally extending shafts 16 about their respective lateral axes. Preferably, at least one motor 30, as shown in FIG. 3, is provided for driving rotation of the longitudinally extending shaft 14 about the longitudinal axis, and for also driving rotation of the rotating members 26 coupled to the continuous belt 28, which, in turn, drives rotation of the laterally extending shafts 16 about the lateral axis.

Figure 3:
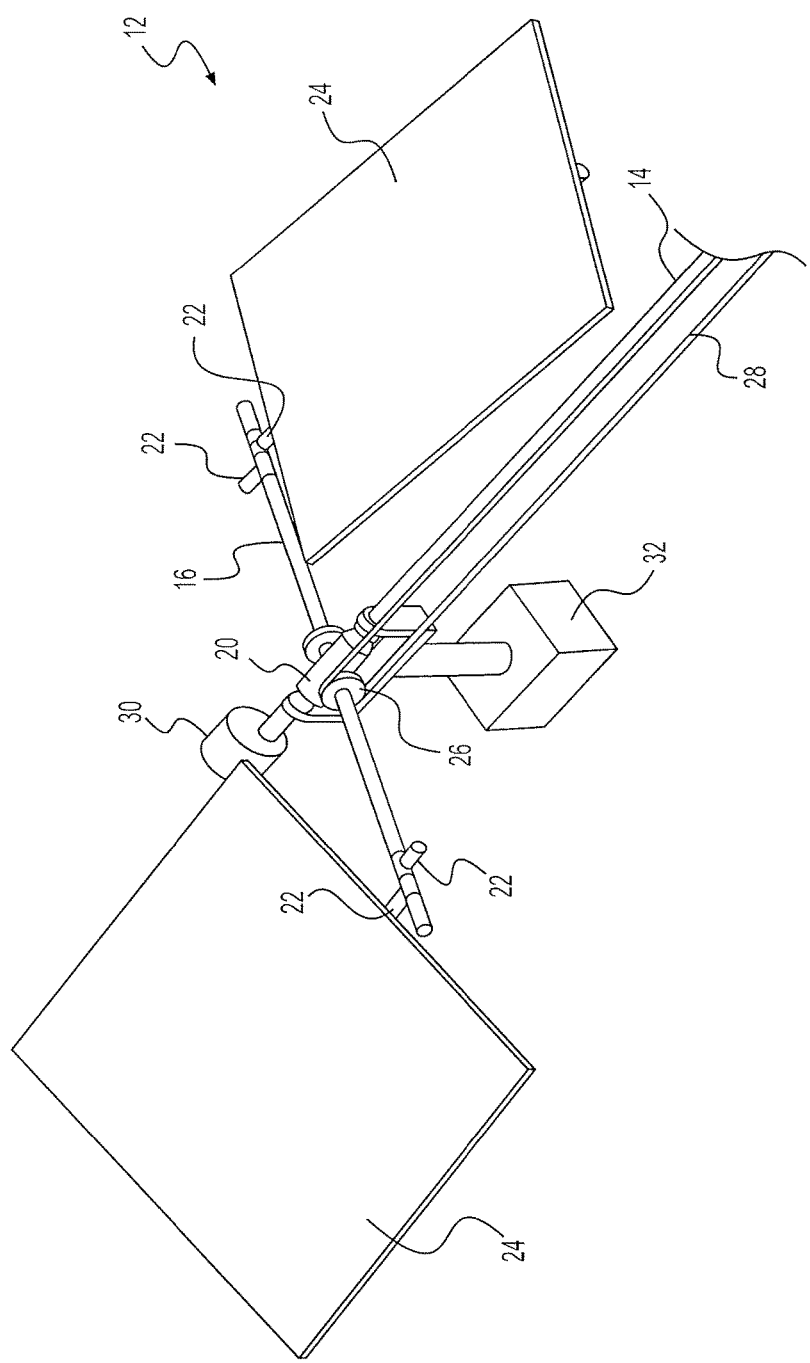
FIG. 3 is a partial perspective view of an individual optical reflector grouping of the solar heating apparatus.

As best seen in FIG. 3, each of the reflector mounts 22 is selectively rotatable with respect to the corresponding one of the laterally extending shafts 16. It should be understood that a pair of optical reflectors 24 have been removed from reflector grouping 12 in FIG. 3 for purposes of illustration and clarity. Each of the optical reflectors 24 can be further rotated via adjustment of the corresponding reflector mount 22 about a third axis of rotation, which is orthogonal to the lateral axis. Here, optical reflectors 24 can be initially manually set to a desired angle and locked in place. Further, as also seen in FIG. 3, a pair of supports 32 are preferably provided for respectively supporting the pair of two-axis bearings 20 and their corresponding brackets 18 above the ground.

Further, as shown, each laterally extending shaft 16 has first and second portions positioned symmetrically about a corresponding one of the two-axis bearings 20, i.e., in the orientation shown in FIG. 2, each laterally extending shaft 16 passes through a corresponding one of the two-axis bearings 20 such that one-half of the laterally extending shaft 16 extends to the left of the two-axis bearing 20, and the other half of the laterally extending shaft 16 extends to the right of the two-axis bearing. In this configuration, the at least one reflector mount 22 includes a plurality of reflector mounts 22, and the at least one optical reflector 24 includes a plurality of optical reflectors 24. A first portion of the plurality of reflector mounts 22 and a first portion of the plurality of optical reflectors 24 are mounted on the first portion of each laterally extending shaft 16, and a second portion of the plurality of reflector mounts 22 and a second portion of the plurality of optical reflectors 24 are mounted on the second portion of each laterally extending shaft 16. In the example of FIGS. 1 and 2, two reflector mounts 22 and two corresponding optical reflectors 24 are mounted on each portion, or half, of each laterally extending shaft 16, thus giving each reflector grouping 12 four separate optical reflectors 24.

Figure 4:
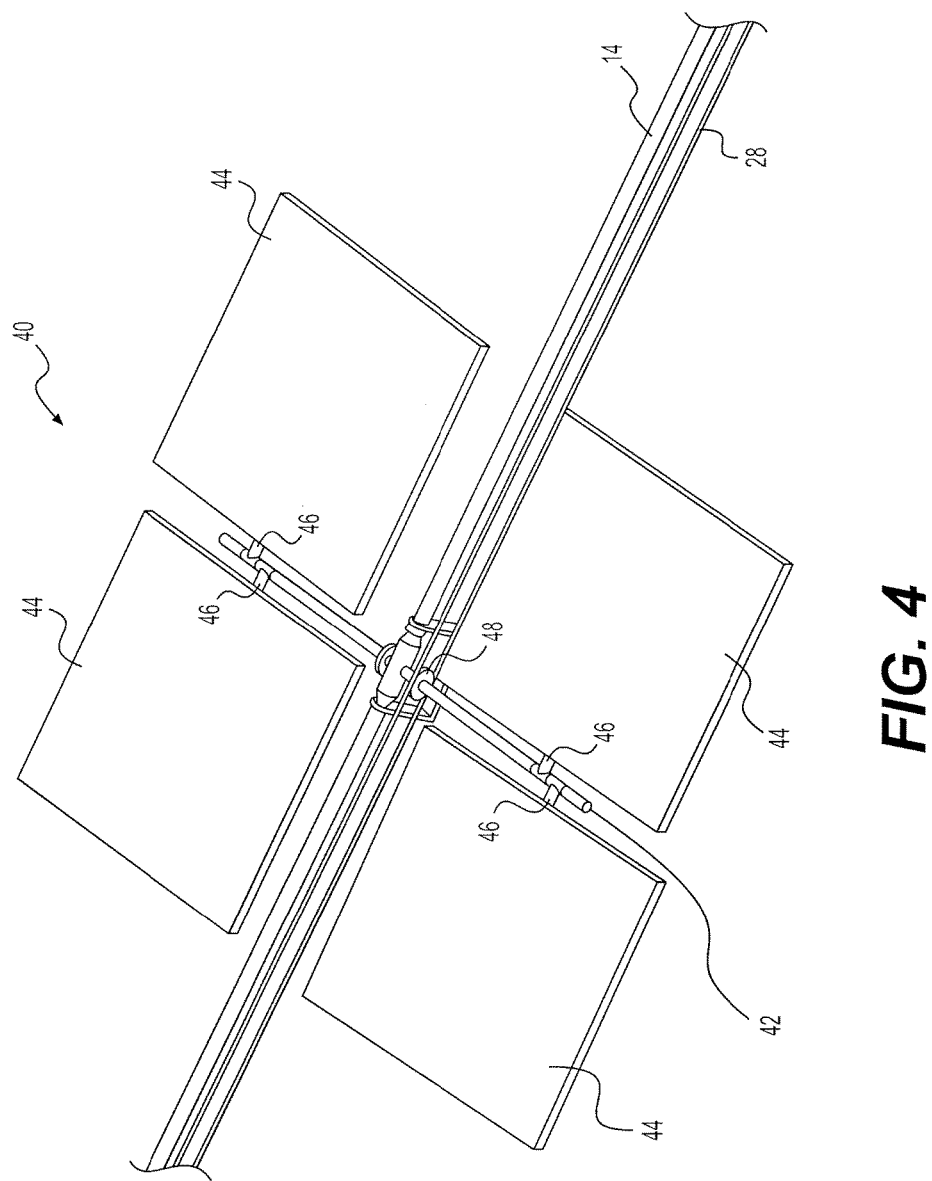
FIG. 4 is a perspective view of an individual central, or secondary, optical reflector grouping of solar heating apparatus.

The above describes a simplified system having only a pair of reflector groupings 12. Preferably, as shown in FIGS. 1 and 4, the array of optical reflectors includes one or more central, or secondary, reflector groupings 40, which are positioned between the above pair of reflector groupings 12. Thus, the multi-axis reflector system 10 preferably further includes at least one secondary laterally extending shaft 42, which is secured to the longitudinally extending shaft 14 and is positioned between the pair of two-axis bearings 20, i.e., reflector groupings 40 are positioned between the end reflector groupings 12. The at least one secondary laterally extending shaft 42 is also selectively rotatable about the lateral axis.

As shown in FIG. 4, at least one secondary reflector mount 46 is secured to the at least one secondary laterally extending shaft 42, with at least one secondary optical reflector 44 mounted on the at least one secondary reflector mount 46. At least one secondary rotating member 48 is secured to the at least one laterally extending shaft 42 for engagement with the continuous belt 28, thus allowing the central, or secondary, reflector groupings 40 to rotate about both the longitudinal and lateral axes, simultaneously with the above pair of end reflector groupings 12. As with groupings 12, the at least one secondary reflector mount 46 is selectively rotatable with respect to the at least one secondary laterally extending shaft 42, allowing optical reflectors 44 to be selectively manually rotated about a third axis, which is orthogonal to the lateral axis.

Similar to that described above with regard to end groupings 12, the at least one secondary laterally extending shaft 42 has first and second portions positioned symmetrically about the longitudinally extending shaft 14. Thus, the at least one secondary reflector mount 46 includes a plurality of secondary reflector mounts 46, and the at least one secondary optical reflector 44 includes a plurality of secondary optical reflectors 44. A first portion of the plurality of secondary reflector mounts 46 and a first portion of the plurality of secondary optical reflectors 44 are mounted on the first portion of the at least one secondary laterally extending shaft 42, and a second portion of the plurality of secondary reflector mounts 46 and a second portion of the plurality of secondary optical reflectors 44 are mounted on the second portion of the at least one secondary laterally extending shaft 42. In the example of FIGS. 1 and 4, two reflector mounts 46 and two corresponding optical reflectors 44 are mounted on each portion, or half, of each laterally extending shaft 42, thus giving each reflector grouping 40 four separate optical reflectors 44.

Figure 5:
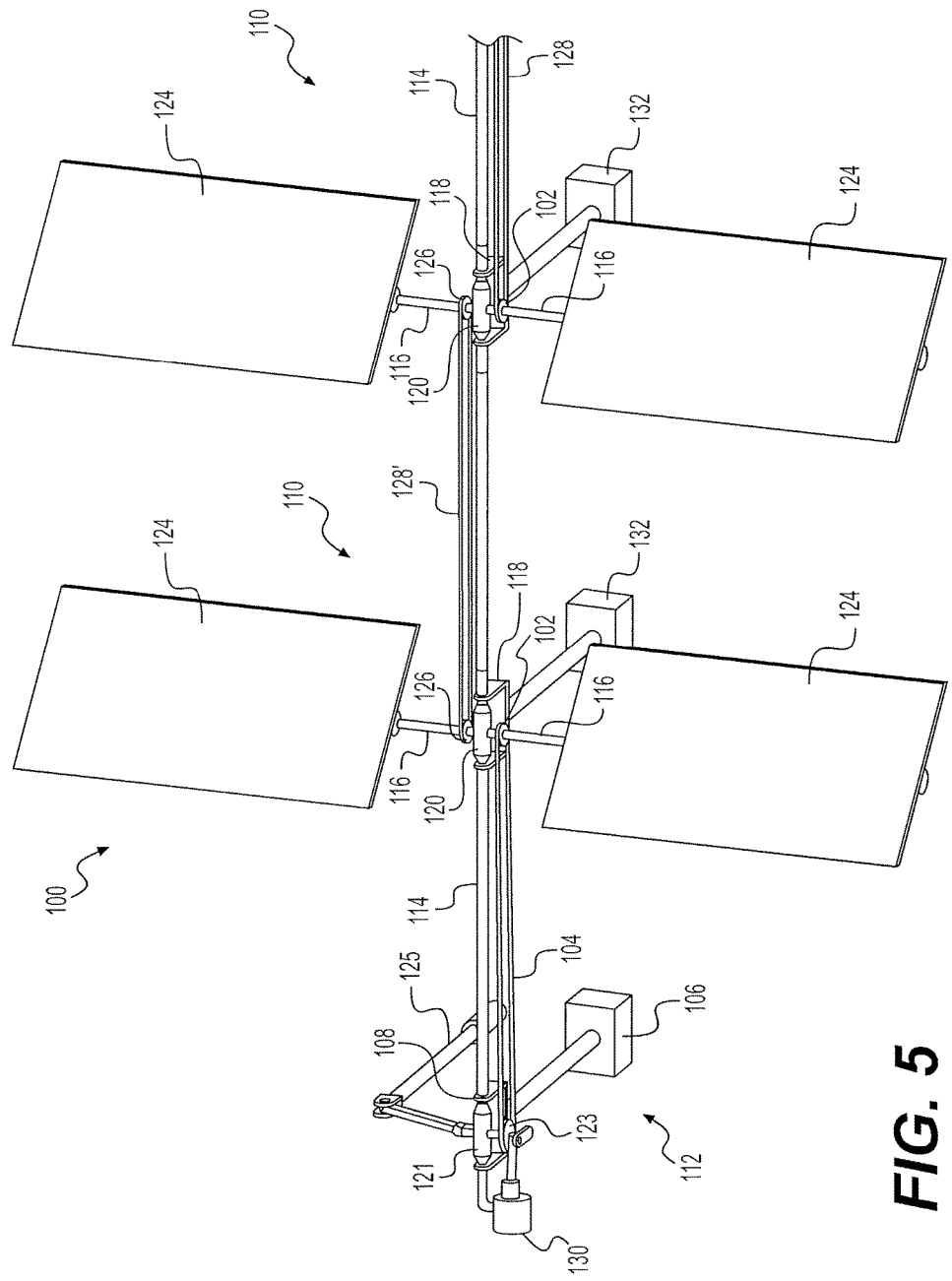
FIG. 5 is a partial perspective view of an alternative embodiment of the solar heating apparatus.
Figure 6:
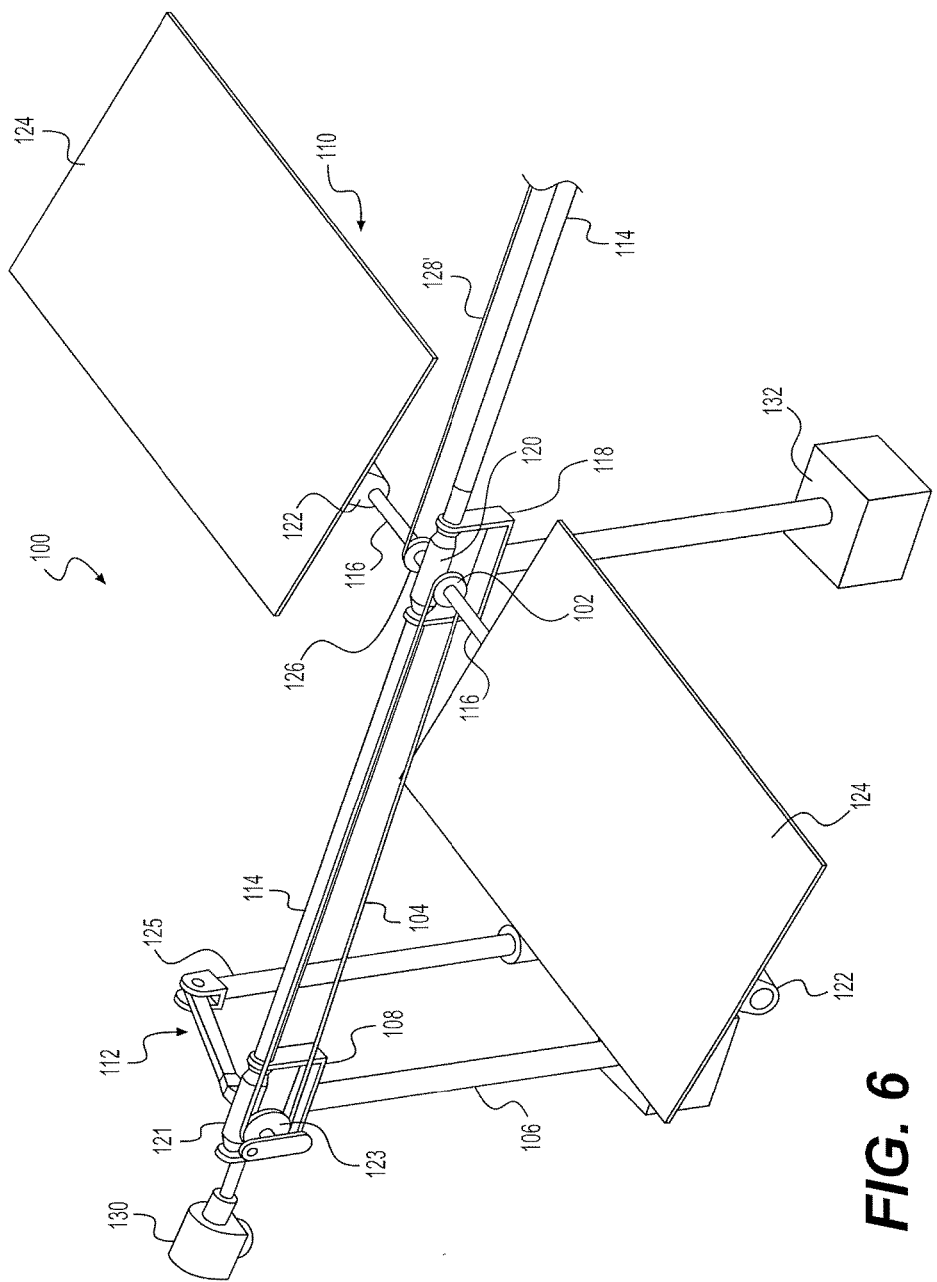
FIG. 6 is a partial perspective view of the solar heating apparatus of FIG. 5.

In the alternative embodiment of FIGS. 5 and 6, the solar heating apparatus 100 includes a plurality of reflector units 110, an actuator unit 112 and a longitudinally extending shaft 114. As in the previous embodiment, the longitudinally extending shaft 114 is selectively rotatable about a longitudinal axis. Each of the reflector units 110 includes a reflector bracket 118, a two-axis reflector bearing 120 mounted on the reflector bracket 118, and a laterally extending shaft 116 secured to the two-axis reflector bearing 120. As in the previous embodiment, the laterally extending shaft 116 is selectively rotatable about a lateral axis. Each of the reflector units 110 further includes at least one reflector mount 122 secured to the laterally extending shaft 116, at least one optical reflector 124 mounted on the at least one reflector mount 122, and first and second rotating members 102, 126, respectively, such as pulley wheels, sprockets or the like, respectively secured to the laterally extending shaft 116.

The actuator unit 112 includes an actuator bracket 108, a two-axis actuator bearing 121 mounted on the actuator bracket 108, and a third rotating member 123 secured to the two-axis actuator bearing 121. The actuator unit 112 further includes a linear actuator 125 for selectively rotating the two-axis actuator bearing 121 about the longitudinal axis and a motor 130 for selectively driving rotation of the third rotating member 123.

A plurality of continuous belts are provided, with one of the continuous belts 104 being mounted on, and extending between, the third rotating member 123 and the first rotating member 102 of an adjacent one of the plurality of reflector units 110. As best shown in FIG. 5, a remainder of the plurality of continuous belts are divided into first and second sets of continuous belts 128, 128', respectively, with the first set of continuous belts 128 being respectively mounted on, and extending between, the first rotating members 102 of a first set of adjacent ones of a remainder of the plurality of reflector units 110, and the second set of continuous belts 128' being respectively mounted on, and extending between, the second rotating members 126 of a second set of adjacent ones of the remainder of the plurality of reflector units 110, i.e., simultaneous rotation about the lateral axis of the laterally extending shafts 116 is achieved by alternating the connections between the first rotating members 102 of adjacent ones of the reflector units 110 and between the second rotating members 126 of adjacent ones of the reflector units 110.

One end of the longitudinally extending shaft 114 is mounted on the two-axis actuator bearing 121 and each of the two-axis reflector bearings 120 is secured to the longitudinally extending shaft 114 such that all bearings rotate about the longitudinal axis simultaneously. The linear actuator 125 selectively drives rotation of the longitudinally extending shaft 114 about the longitudinal axis, and the motor 130 selectively drives rotation of each of the laterally extending shafts 116 by driving rotation of the third rotating member 123.

Similar to the previous embodiment, a plurality of reflector supports 132 are provided for respectively supporting the two-axis reflector bearings 120 (and their corresponding brackets 118) above the ground, as well as an actuator support 106 for supporting the two-axis actuator bearing 121 (and its bracket 108) above the ground. Also similar to the previous embodiment, each laterally extending shaft 116 has first and second portions positioned symmetrically about a corresponding one of the two-axis reflector bearings 120. As shown, the at least one reflector mount preferably includes first and second reflector mounts 122, and the at least one optical reflector correspondingly includes first and second optical reflectors 124. The first reflector mount 122 and the first optical reflector 124 are mounted on the first portion of each laterally extending shaft 116 (i.e., on one side of the corresponding bearing 120), and the second reflector mount 122 and the second optical reflector 124 are mounted on the second portion of each laterally extending shaft 116 (i.e., on the other side of the corresponding bearing 120).

It is to be understood that the solar heating apparatus is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A solar heating apparatus, comprising:
a pair of longitudinally spaced apart brackets;

a pair of two-axis bearings respectively mounted on the pair of longitudinally spaced apart brackets;

a longitudinally extending shaft secured to, and extending between, the pair of two-axis bearings, the longitudinally extending shaft being selectively rotatable about a longitudinal axis;

a pair of laterally extending shafts respectively secured to the pair of two-axis bearings, each of the laterally extending shafts being selectively rotatable about a lateral axis, wherein each of the laterally extending shafts has first and second portions positioned symmetrically about a corresponding one of the two-axis bearings;

at least one reflector mount secured to each of the laterally extending shafts, wherein each of the at least one reflector mount is selectively rotatable with respect to the corresponding one of the laterally extending shafts;

at least one optical reflector mounted on the at least one reflector mount of each of the laterally extending shafts;

a pair of rotating members respectively secured to the pair of laterally extending shafts;

a plurality of continuous belts; each belt mounted on, and extending between, the pair of rotating members to selective drive simultaneous rotation of the pair of laterally extending shafts about their respective later axes;

each belt driving the successive belt through connection at a respective laterally extending shaft at least one secondary laterally extending shaft secured to the longitudinally extending shaft, the at least one secondary laterally extending shaft being positioned between the pair of two-axis bearings and selectively rotatable about the lateral axis, wherein the at least one secondary laterally extending shaft has first and second portions positioned symmetrically about the longitudinally extending shaft;

at least one secondary reflector mount secured to the at least one secondary laterally extending shaft, wherein the at least one secondary reflector mount is selectively rotatable with respect to the at least one secondary laterally extending shaft;

at least one secondary optical reflector mounted on the at least one secondary reflector mount; and at least one secondary rotating member secured to the at least one laterally extending shaft for engagement with the continuous belt.

2. The solar heating apparatus as recited in claim 1, further comprising a pair of supports for respectively supporting the pair of two-axis bearings above the ground.

3. The solar heating apparatus as recited in claim 1, wherein the at least one reflector mount comprises a plurality of reflector mounts, and the at least one optical reflector comprises a plurality of optical reflectors, a first portion of the plurality of reflector mounts and a first portion of the plurality of optical reflectors being mounted on the first portion of each said laterally extending shaft, and a second portion of the plurality of reflector mounts and a second portion of the plurality of optical reflectors being mounted on the second portion of each said laterally extending shaft.

4. The solar heating apparatus as recited in claim 1, wherein the at least one secondary reflector mount comprises a plurality of secondary reflector mounts, and the at least one secondary optical reflector comprises a plurality of secondary optical reflectors, a first portion of the plurality of secondary reflector mounts and a first portion of the plurality of secondary optical reflectors being mounted on the first portion of the at least one secondary laterally extending shaft, and a second portion of the plurality of secondary reflector mounts and a second portion of the plurality of secondary optical reflectors being mounted on the second portion of the at least one secondary laterally extending shaft.

5. A solar heating apparatus, comprising:

a longitudinally extending shaft selectively rotatable about a longitudinal axis;

a plurality of reflector units, wherein each of the reflector units includes:

a reflector bracket;

a two-axis reflector bearing mounted on the reflector bracket;

a laterally extending shaft secured to the two-axis reflector bearing, the laterally extending shaft being selectively rotatable about a lateral axis, wherein the laterally extending shaft has first and second portions positioned symmetrically about the corresponding two-axis reflector bearings;

at least one reflector mount secured to the laterally extending shaft;

at least one optical reflector mounted on the at least one reflector mount; and first and second rotating members respectively secured to the laterally extending shaft;

an actuator unit having:

an actuator bracket;

a two-axis actuator bearing mounted on the actuator bracket;

a third rotating member secured to the two-axis actuator bearing;

a linear actuator for selectively rotating the two-axis actuator bearing about the longitudinal axis; and a motor for selectively driving rotation of the third rotating member;

a plurality of continuous belts, one of the plurality of continuous belts being mounted on and extending between the third rotating member and the first rotating member of one of the plurality of reflector units, a remainder of the plurality of continuous belts having first and second sets of continuous belts, the first set of continuous belts being respectively mounted on and extending between the first rotating members of a first set of adjacent ones of a remainder of the plurality of reflector units, the second set of continuous belts being respectively mounted on and extending between the second rotating members of a second set of adjacent ones of the remainder of the plurality of reflector units;

wherein one end of the longitudinally extending shaft is mounted on the two-axis actuator bearing and each said two-axis reflector bearing is secured to the longitudinally extending shaft, whereby the linear actuator selectively drives rotation of the longitudinally extending shaft about the longitudinal axis, and the motor selectively drives rotation of each said laterally extending shaft by driving rotation of the third rotating member.

6. The solar heating apparatus according to claim 5, further comprising:

a plurality of reflector supports for respectively supporting the two-axis reflector bearings above the ground; and an actuator support for supporting the two-axis actuator bearing above the ground.

7. The solar heating apparatus as recited in claim 5, wherein:

the at least one reflector mount comprises first and second reflector mounts; and the at least one optical reflector comprises first and second optical reflectors, the first reflector mount and the first optical reflector being mounted on the first portion of each said laterally extending shaft, and the second reflector mount and the second optical reflector being mounted on the second portion of each said laterally extending shaft.

\* \* \* \* \*